US008068591B2

(12) United States Patent
Soo et al.

(10) Patent No.: US 8,068,591 B2
(45) Date of Patent: Nov. 29, 2011

(54) METHOD, SYSTEM AND APPARATUS FOR ANNOUNCING CALLER INFORMATION OVER A TELEVISION LINK

(75) Inventors: Sieark Joseph Soo, Orleans (CA); Marie Berthe Barbara Wilkes, Orleans (CA); Martin Pierre Beauvais, Kanata (CA)

(73) Assignee: BCE Inc., Verdun, Quebec (CA)

( * ) Notice: Subject to any disclaimer, the term of this patent is extended or adjusted under 35 U.S.C. 154(b) by 1432 days.

(21) Appl. No.: 11/536,318

(22) Filed: Sep. 28, 2006

(65) Prior Publication Data

US 2007/0121854 A1 May 31, 2007

Related U.S. Application Data

(63) Continuation of application No. PCT/CA2005/001768, filed on Nov. 21, 2005.

(51) Int. Cl.
*H04M 1/56* (2006.01)

(52) U.S. Cl. ............. 379/142.01; 379/88.11; 379/88.19; 379/102.03; 379/142.06; 379/142.17; 379/93.23; 379/384; 379/196; 379/245; 379/373.02; 370/384; 370/522; 725/106

(58) Field of Classification Search ............... 379/93.23, 379/142, 142.01, 88.11, 88.19, 102.03, 142.06, 379/142.17, 384, 196, 245; 370/384, 522
See application file for complete search history.

(56) References Cited

U.S. PATENT DOCUMENTS

| 4,656,658 | A | * | 4/1987 | King ........................ 379/221.06 |
| 5,388,150 | A | | 2/1995 | Schneyer et al. |
| 5,751,707 | A | * | 5/1998 | Voit et al. ....................... 370/384 |
| 6,032,195 | A | * | 2/2000 | Reber et al. ................... 709/245 |
| 6,141,058 | A | | 10/2000 | Lagoni et al. |
| 6,292,479 | B1 | | 9/2001 | Bartholomew et al. |
| 6,546,092 | B2 | | 4/2003 | Corbett et al. |
| 6,678,362 | B2 | | 1/2004 | Hong et al. |
| 6,831,939 | B2 | | 12/2004 | Ju |
| 2002/0147988 | A1 | | 10/2002 | Nakano |

(Continued)

FOREIGN PATENT DOCUMENTS

CA    CA 2 256 564    12/1997

OTHER PUBLICATIONS

Office Action issued by the Canadian Intellectual Property Office on Mar. 10, 2010 in connection with Canadian Patent Application No. 2,576,133, 3 pages.

(Continued)

*Primary Examiner* — Curtis Kuntz
*Assistant Examiner* — Yosef K Laekemariam

(57) ABSTRACT

A method, system and apparatus for announcing caller information to users over a television link. The method comprises receiving signalling information associated with an incoming call destined for a destination party, the signalling information comprising a portion conveying information regarding an origin of the incoming call and information regarding an identity of the destination party. The method also comprises attempting to establish a telephony link with a device associated with the destination party over a communication network in response to said receiving. The method further comprises attempting to establish a second telephony link with a processing entity to convey said portion of the signalling information to the processing entity to cause delivery of an indication of the origin of the incoming call over a television link associated with the destination party, said indication based on said information regarding an origin of the incoming call.

77 Claims, 7 Drawing Sheets

U.S. PATENT DOCUMENTS

| | | |
|---|---|---|
| 2003/0190024 A1 | 10/2003 | Ju |
| 2003/0234815 A1 | 12/2003 | Delaney |
| 2004/0052341 A1 | 3/2004 | Yeh et al. |
| 2004/0218583 A1 | 11/2004 | Adan et al. |
| 2004/0229608 A1* | 11/2004 | Isukapalli et al. ......... 455/432.1 |
| 2004/0261115 A1 | 12/2004 | Bartfeld |
| 2005/0074105 A1 | 4/2005 | Corbett et al. |
| 2005/0190756 A1 | 9/2005 | Mundra et al. |
| 2006/0031904 A1 | 2/2006 | Groff et al. |
| 2006/0115062 A1 | 6/2006 | Gonder et al. |

OTHER PUBLICATIONS

PCT/CA2005/001768 (ISR), Aug. 21, 2006, BCE Inc.

Office Action issued by the United States Patent and Trademark Office on Feb. 8, 2011 in connection with U.S. Appl. No. 11/536,374, 40 pages.

* cited by examiner

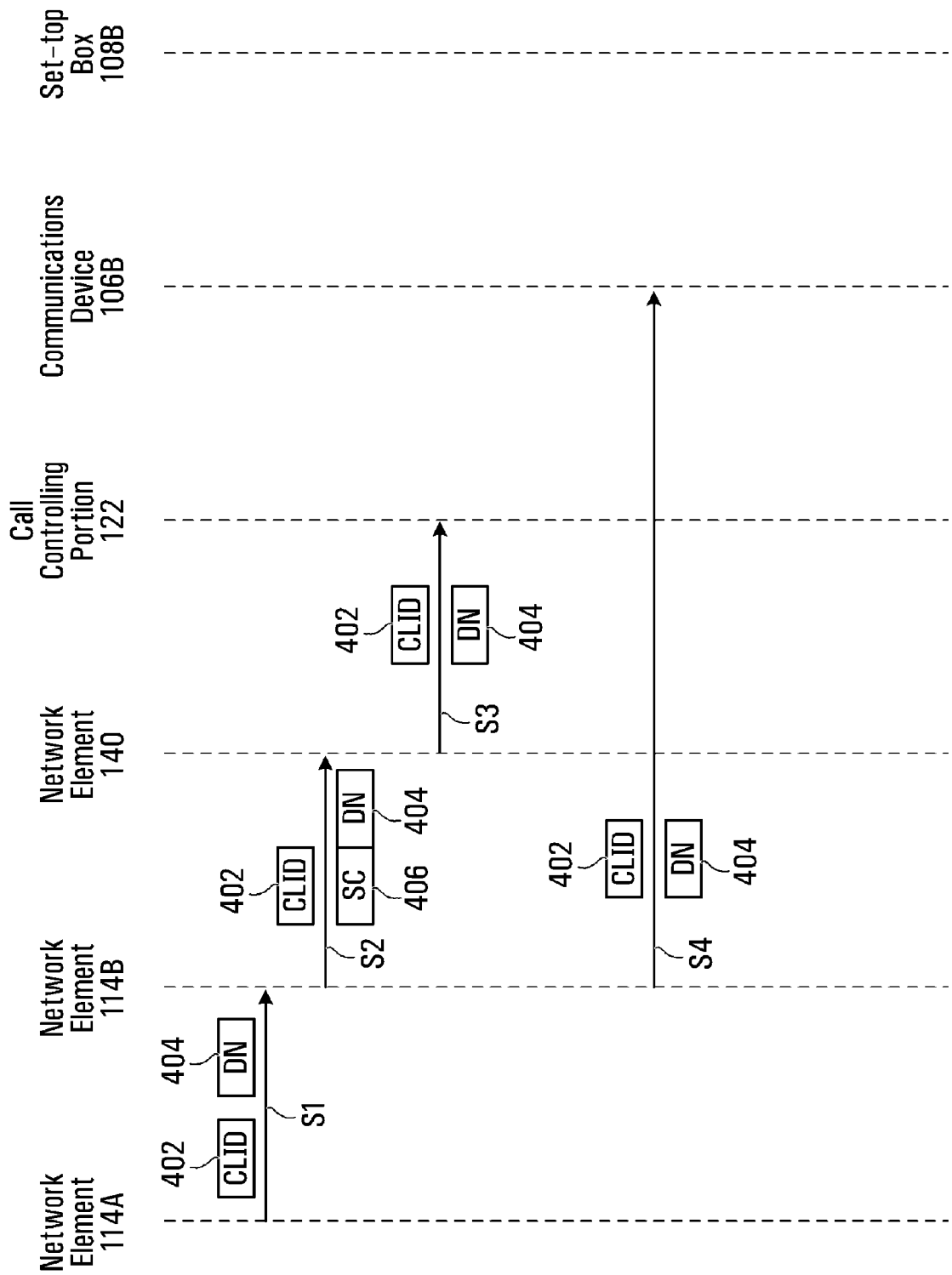

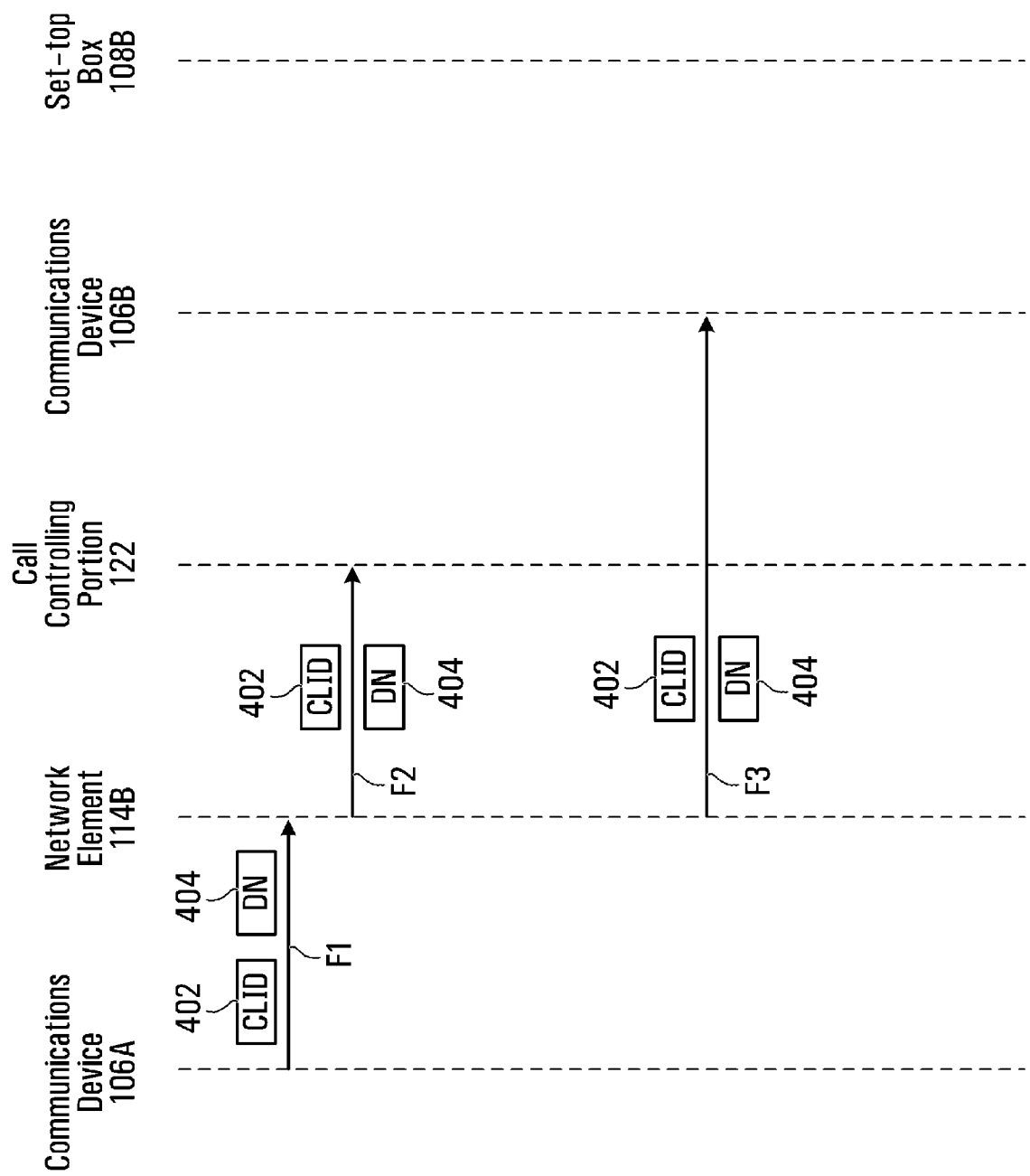

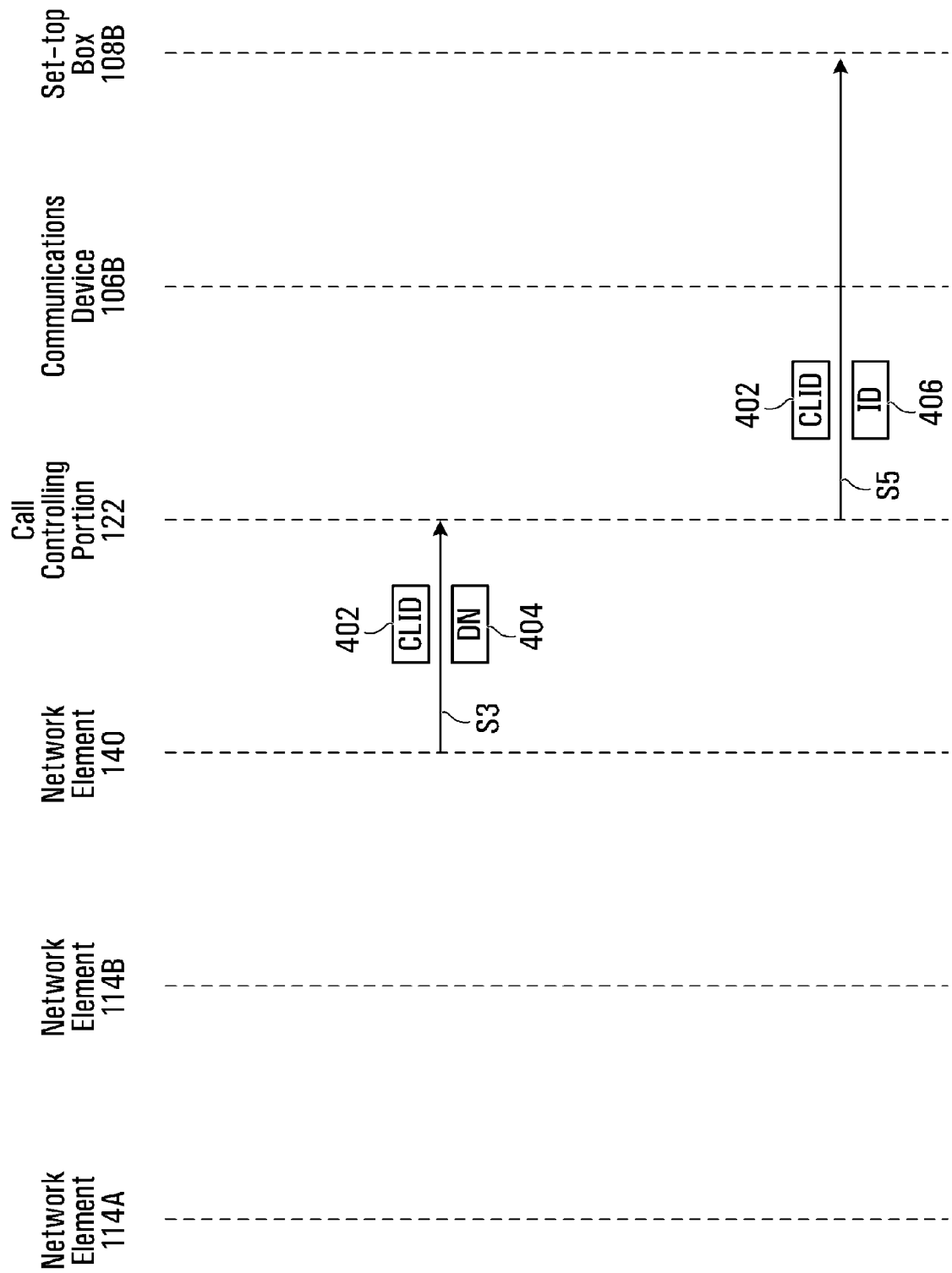

METHOD, SYSTEM AND APPARATUS FOR ANNOUNCING CALLER INFORMATION OVER A TELEVISION LINK

CROSS-REFERENCE TO RELATED APPLICATION

This present application is a continuation of, and claims the benefit under 35 USC 120 of, PCT Patent Application Serial Number PCT/CA2005/001768 entitled "METHOD, SYSTEM AND APPARATUS FOR ANNOUNCING CALLER INFORMATION OVER A TELEVISION LINK", filed on Nov. 21, 2005, filed in the English language, designating the United States and hereby incorporated by reference herein.

FIELD OF THE INVENTION

This invention relates generally to video delivery systems and more specifically to a method, system and apparatus for announcing caller information over a television link.

BACKGROUND OF THE INVENTION

With recent developments in the telecommunications industry, customers are not only expecting basic telephony services (such as reliable voice connectivity from one point to another), but also expect to receive a number of augmented services. In particular, customers expect to have access to services such as voice mail, call forwarding, three-way calling and Caller Line ID (CLID) information announcements. By virtue of the CLID information announcement feature, customers can obtain information about a calling party before actually accepting a call. Generally, information about the calling party can comprise a telephone number of the calling party and/or a name of the calling party that is registered in association with the telephone number of the calling party. Obtaining CLID information prior to answering the call allows customers to make a decision how to treat the call, such as whether to answer or ignore the call. This service is particularly suitable for call screening, for instance screening calls from unknown or blacklisted parties.

Several types of devices for announcing CLID information are known in the art. A first type of device is incorporated into a telephone set (whether wired or cordless), referred to herein below as a built-in device. Another type of device is a stand-alone device connected in-line between the telephone set and the telephone jack. Such stand-alone devices allow users of telephone sets that do not have the aforementioned built-in devices to nonetheless enjoy the benefits of CLID information announcement. Both types of devices are operable to extract CLID information from received SS7 network signalling information and to process this information to announce the CLID information to the user (typically by means of a display). Some stand-alone devices can display the CLID information on a television screen, allowing the viewers to see who is calling while they are watching the television.

Users who would like to receive CLID information announcement on the television screen while watching a particular program on their television screen find the aforementioned solutions unsatisfactory. In a specific case where the telephony link to the user's telephone is busy (for instance, when the user or someone else in the user's household is using the phone), and a second call destined for the user's telephone is originated, the user may not receive an announcement of the second incoming call on his or her television screen.

Thus, improvements in the convenience with which users may get CLID information announcement on their television screen would be welcomed.

SUMMARY OF THE INVENTION

A first broad aspect of the present invention seeks to provide a method. The method comprises receiving signalling information associated with an incoming call destined for a destination party, the signalling information comprising a portion conveying information regarding an origin of the incoming call and information regarding an identity of the destination party. The method further comprises responsive to the receiving, attempting to establish a telephony link with a device associated with the destination party over a communication network. The method further comprises. attempting to establish a second telephony link with a processing entity to convey the portion of the signalling information to the processing entity to cause delivery of an indication of the origin of the incoming call over a television link associated with the destination party, the indication based on the information regarding an origin of the incoming call.

A second broad aspect of the present invention seeks to provide a method. The method comprises receiving a telephony call from a network element responsible for handling an incoming call destined for a device associated with a destination party, the telephony call having been established by the network element in response to receiving signalling information associated with the incoming call destined for the destination party; the signalling information comprising a portion conveying information regarding an origin of the incoming call and information regarding an identity of the destination party; the telephony call having been established to convey the portion of the signalling information. The method further comprises responsive to the receiving, causing transmission of an announcement trigger over a television link associated with the destination party to cause an indication of the origin of the incoming call to be announced to the destination party, the indication based on the information regarding an origin of the incoming call.

A third broad aspect of the present invention seeks to provide a system. The system comprises at least one network element associated with a communication network and a processing entity. The at least one network element is operable: to receive signalling information associated with an incoming call destined for a destination party, the signalling information comprising a portion conveying information regarding an origin of the incoming call and information regarding an identity of the destination party; responsive to receiving the signalling information, to attempt establishing a telephony link with a device associated with the destination party over a portion of the communication network; and to attempt establishing a second telephony link with the processing entity to convey the portion of the signalling information to the processing entity. The processing entity is operable to receive the portion of the signalling information to cause delivery of an indication of the origin of the incoming call over a television link associated with the destination party, the indication based on the information regarding an origin of the incoming call.

A fourth broad aspect of the present invention seeks to provide a network element comprising: means for receiving signalling information associated with an incoming call destined for a destination party, the signalling information comprising a portion conveying information regarding an origin of the incoming call and information regarding an identity of the destination party; means for attempting to establish a telephony link with a device associated with the destination party over a communication network responsive to the receiving, and means for attempting to establish a second telephony link with a processing entity to convey the portion of the signalling information to a processing entity to cause delivery of the information regarding the origin of the call over a television link associated with the destination party.

Another broad aspect of the present invention seeks to provide an apparatus. The apparatus comprises a first interface operable to connect to a communication network and to receive a telephony call from a network element responsible for handling an incoming call destined for a device associated with a destination party, the telephony call having been established by the network element in response to receiving signalling information associated with the incoming call destined for the destination party; the signalling information comprising a portion conveying information regarding an origin of the incoming call and information regarding an identity of the destination party; the telephony call having been established to convey the portion of the signalling information. The apparatus further comprises a second interface operable to connect to a television link associated with the destination party; and a processing unit coupled to the first and second interfaces; the processing unit operable to receive the signalling information via the first interface and to cause transmission via the second interface of an announcement trigger to cause an indication of the origin of the incoming call to be announced to the destination party, the indication based on the information regarding an origin of the incoming call.

BRIEF DESCRIPTION OF THE DRAWINGS

A detailed description of specific embodiments of the invention is provided herein below, by way of example only, with reference to the accompanying drawings, in which:

FIGS. 4A and 4B depict a logical signal flow diagram that illustrates exchange of signals containing information associated with an originator of an incoming call between various elements of the system of FIG. 1 while performing the method of FIG. 2 in two embodiments of the present inventions.

FIG. 4C depicts a logical signal flow diagram that illustrates exchange of signals containing information associated with an originator of an incoming call between various elements of the system of FIG. 1 while performing the method of FIG. 3.

Figure 1:
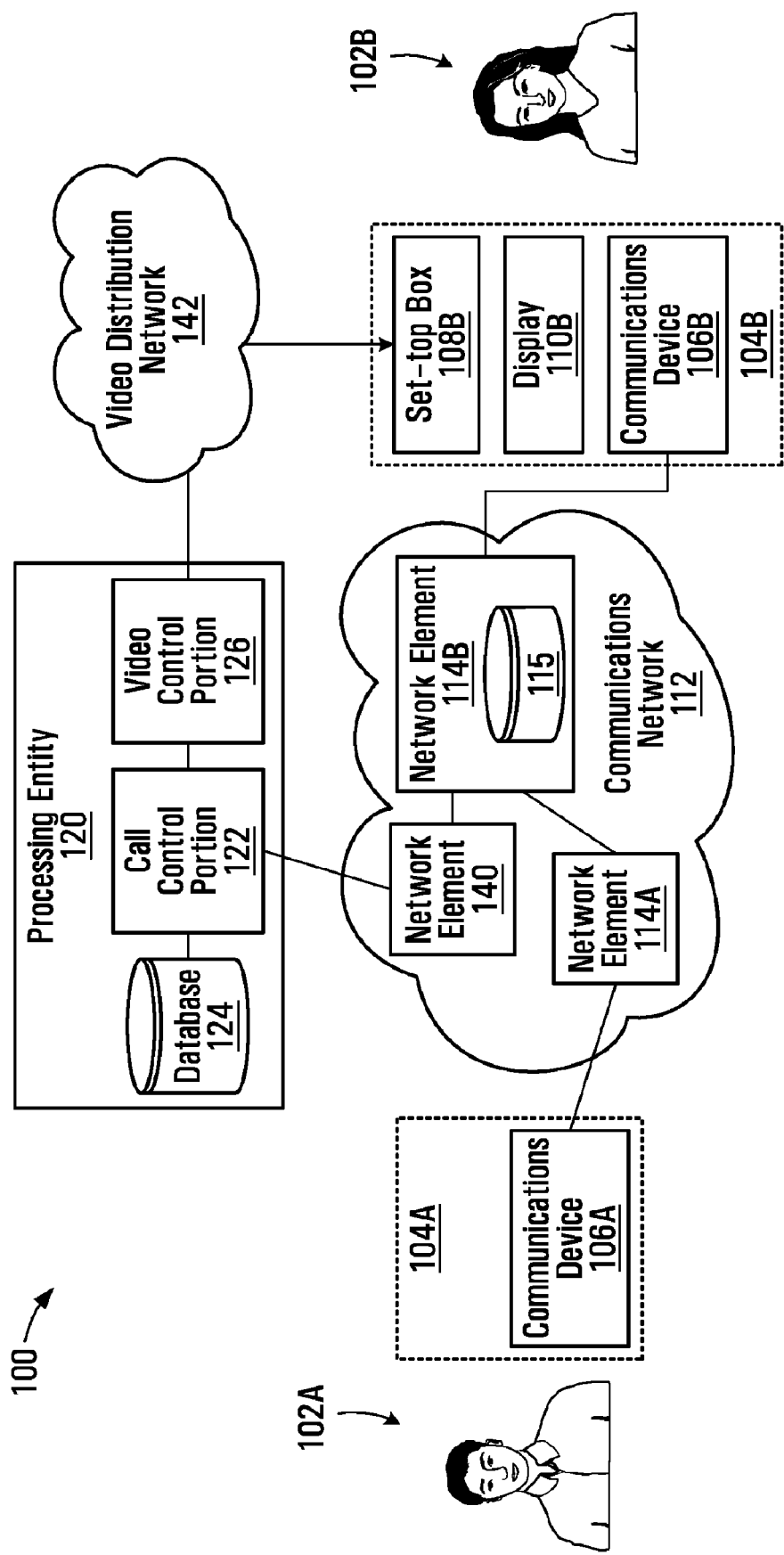
FIG. 1 is a conceptual block diagram showing various components of a system for extracting information indicative of an originator of an incoming call for announcement to a user on a television screen.

In the drawings, the embodiments of the invention are illustrated by way of examples. It is to be expressly understood that the description and drawings are only for the purposes of illustration and are an aid for understanding. They are not intended to be a definition of the limits of the invention.

DETAILED DESCRIPTION OF EMBODIMENTS

In the scenario to be described below with reference to FIG. 1 which depicts a system 100 for extracting information indicative of an originator of an incoming call for announcement to a user on a television screen, an originating party 102A is desirous of placing an incoming call to a destination party 102B. The originating party 102A has access to a number of devices situated in originating party premises 104A, including but not necessarily limited to a communication device 106A. It should be understood, that the originating party 102A may have access to a number of other devices located in the originating party premises 104A, such as one or more set-top boxes, one or more computing apparatuses, and one or more displays and the like.

The destination party 102B can have access to a number of devices situated in destination party premises 104B, such as a communication device 106B, a set-top box 108B and a display 110B. It should be understood that the destination party 102B may have access to a number of other devices located in the destination party premises 104B, such as one or more computing apparatuses, other set-top boxes and displays and the like.

The destination party 102B may have a business relationship with a service provider (not depicted) who provides telephony and/or other services to the destination party 102B. The service provided can be a Competitive Local Exchange Carrier (CLEC), an Incumbent Local Exchange Carrier (ILEC), an Internet telephony service provider or the like. For instance, the service provider who has entered into a business relationship with the destination party 102B can be Bell Canada of 1050 Beaver Hall Hill, Montreal, Quebec, Canada. The service provider can deliver a number of telephony services to the destination party 102B, such as local calling, long-distance calling, as well as a number of augmented services, such as three-way calling, conference calling, call waiting and the like. The service provider can be further operable to deliver a CLID information announcement feature according to the teachings of this invention. It should be appreciated that the CLID information announcement feature can be delivered on a subscription basis (i.e. the destination party 102B needs to subscribe to the service and/or pay a subscription fee) or as part of a service package. It should be appreciated that the originating party 102A may have a business relationship with the same or a different service provider.

The communication device 106A is connected to the communication device 106B via a communication network 112. The communication network 112 can be under control and/or management of the service provider with whom the destination party 102B has a business relationship or, alternatively, under control and/or management of a different service provider or a third party. The nature of the communication network 112 is not particularly limiting and, as such, the communications network 112 can include a portion of the Public Switched Telephone Network (PSTN), a cellular network, a data network adapted for handling Voice-over-IP (VoIP) calls (such as the Internet), or a combination thereof. It will be appreciated that the type of the communication network 112 and the type of the communication devices 106A and 106B are interdependent. For example, if the communication devices 106A and 106B are POTS phones, then the communication network 112 will comprise at least a portion of the PSTN. On the other hand, if the communication devices 106A and 106B are Voice-over-IP (VoIP) phones, than the communication network 112 will comprise at least a portion of the data network adapted for handling Voice-over-IP (VoIP) calls (such as the Internet). In yet another example, if the communication device 106A is a POTS phone and the communication device 106B is a Voice-over-IP (VoIP) phone, then the communication network 112 will comprise at least a portion of the PSTN and at least a portion of the data network (such as the Internet) with suitable media gateways for converting analog voice to IP packets and vice versa well known to those of skill in the art. Other variations will be apparent to those of skill in the art. As such, when the incoming call originates from the communication device 106A, it passes through the communications network 112 to reach the communication device 106B.

The communication network 112 may comprises a network element 114A, a network element 114B and a network element 140. The type of network elements 114A, 114B and 140 is not particularly limiting and will depend on the type of the communication network 112. To illustrate, in the case where the communication network 112 comprises the PSTN, the network elements 114A, 114B and 140 can comprise switches, such as DMS-100 switches manufactured and distributed by Nortel Networks of 8200 Dixie Road, Brampton, Ontario L6T 5P6, Canada. As a further illustration, in the case where the communication network 112 comprises the data network adapted for handling Voice-over-IP (VoIP) calls (such as the Internet), the network elements 114A, 114B and 140 can comprise so-called soft switches, such as a MCS 5200 Soft Switch manufactured by Nortel Networks of 8200 Dixie Road, Brampton, Ontario L6T 5P6, Canada. In some embodiments of the present invention, the network elements 114A, 114B and 140 can be embodied in a single soft switch. It should be understood that any other suitable network element can be deployed.

Irrespective of the type of network elements 114A, 114B or 140 deployed, the network elements 114A, 114B and 140 are operable to route calls between various end-points. In particular, the network elements 114A and 114B are operable to route the incoming call from the communication device 106A to the communication device 106B. Specifically, when the incoming call is originated from the communication device 106A, it is first received at the network element 114A. The incoming call includes signalling information, which can be SS7 signalling information in case of the communication network 112 comprising the PSTN and Session Initiation Protocol (SIP) messages in the case of the communication network 112 comprising the data network adapted for handling Voice-over-IP (VoIP) calls. Responsive to receiving the signalling information, the network element 114A is operable to identify the network element 114B associated with the communication device 106B and the appropriate route to such network element 114B. As will be appreciated by those of skill in the art, where the communication network 112 comprises the PSTN, this process comprises establishing a circuit between the network element 114A and the network element 114B. Where the communication network 112 comprises the data network adapted for handling Voice-over-IP (VoIP) calls, this process comprises routing the packets from the network element 114A to the network element 114B.

The network element 114B can comprise a processing database 115. The processing database 115 can comprise a list of all the destination parties (such as the destination party 102B) which the network element 114B serves. For example, the processing database 115 can comprise network identifiers associated with various destination parties (such as a telephone number associated with the communication device 106B associated with the destination party 102B) whose telephony links terminate on the network element 114B. The processing database 115 can further comprise an indication of various augmented services that a particular destination party (such as destination party 102B) is subscribed to. For instance, if the destination party 102B subscribes to the CLID information announcement feature of this invention, the processing database 115 can be provisioned with a CLID announcement flag in association with the network identifier of the destination party 114B. The CLID announcement flag can be a Termination Attempt Trigger, a simultaneous ring trigger or another suitable trigger. It should be appreciated that network elements 114A and 140 can have processing databases similar to the processing database 115.

With continued reference to FIG. 1, there is also provided a processing entity 120 coupled to the communication network 112 via the aforementioned network element 140. The processing entity 120 may be under the control and/or management of the service provider with whom the destination party 102B has a business relationship. Alternatively, the processing entity 120 may be under control and/or management of a third party. The processing entity 120 is coupled to the network element 140 which is operable to process calls to/from the processing entity 120 via the communication network 112. The network element 140 can be identical in structure to the network elements 114A and 114B.

The processing entity 120 can comprise a call control portion 122, a video control portion 126 and a database 124. It should be appreciated that the processing entity 120 may contain a number of other components used for other purposes than the purpose of this invention.

In one embodiment of the present invention, the call control portion 122 can comprise an HP Proliant DL380 G2 Telephony Server (Dual CPU 1.4 GHz Intel Pentium III, RAM 2 Gigs) manufactured by Hewlett-Packard Company of 3000 Hanover Street, Palo Alto, Calif., USA, and 2 NMS CG6000 card manufactured by NMS Communications of 100 Crossing Boulevard, Framingham, Mass., USA with the RedHat Linux Enterprise Edition 3 WS software distributed by RedHat Corporation of 1801 Varsity Drive, Raleigh, N.C., USA. The call control portion 122 can further comprise call processing logic, the call processing logic being responsible for controlling various hardware components of the call control portion 122 (for example, the HP Proliant DL380 G2 Telephony Server or other components of the call control portion 122) and for receiving and processing signalling information. In some embodiments of the present invention, the call processing logic can comprise a Ubiquity Application Server, which can be provided by Ubiquity of 515 Legget Drive, Suite 400, Ottawa, Ontario, Canada. The Ubiquity Application Server can be operable to receive, unwrap and process SIP-based signalling information. In other embodiments, the call processing logic can comprise a Java-based software application for receiving, unwrapping and processing SS7-based signalling information. It should be understood that any other suitable call processing logic can be employed for the purposes of this invention and as one skilled in the art will appreciate, the call processing logic will depend on the type of the signalling information and the type of processing required. It should be recognized that the call control portion 122 can further comprise a number of other hardware, firmware and software components. For instance, in some embodiments of the present invention, the call control portion 122 can further comprise a media server, which can be used for DTMF signal detection and the like.

The call control portion 122 is coupled to the network element 140 and, as such, is operable to receive an incoming call via the communication network 112, to initiate an outgoing call via the communication network 112, to detect DTMF tones via the communication network 112 and to receive and process CLID information. Other functions performed by the call control portion 122 will become apparent to those skilled in the art having regard to the teachings of this invention. In some embodiments of the present invention, the network element 140 is connected to the call control portion 122 via an ISDN PRI (MegaLink).

Figure 5:
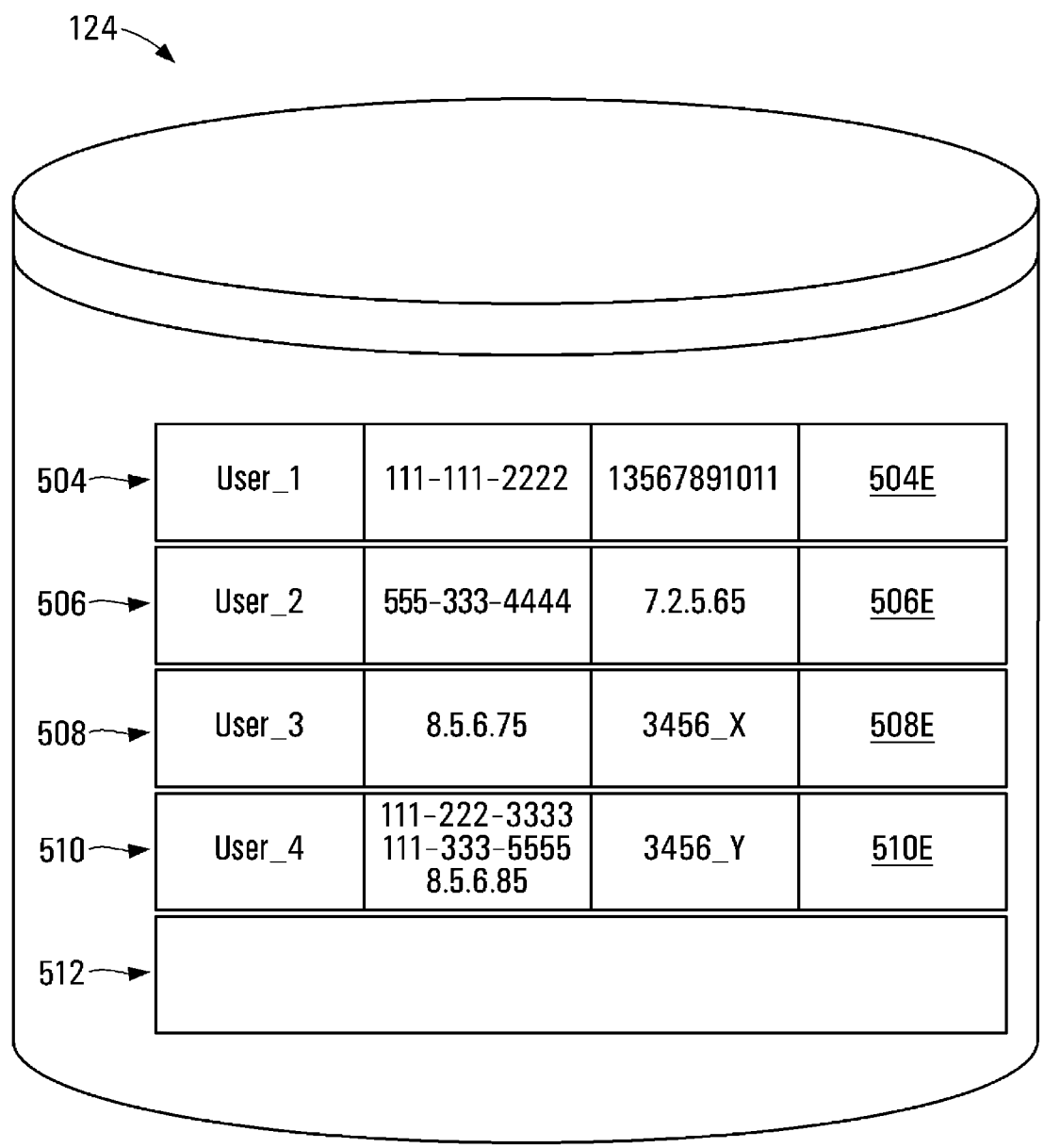
FIG. 5 depicts a conceptual block diagram of a database maintained by a processing entity of FIG. 1.

The processing entity 120 further comprises the aforementioned database 124, which is accessible by the call control portion 122 and may be used for storing a plethora of information, including a plurality of user profiles. With reference to FIG. 5, the content of the database 124 will now be described. The database 124 comprises a number of records, such as records 504, 506, 508 and 510. Each record can be associated with a particular destination party, such as the destination party 102B or any other destination party that subscribes to the CLID information announcement feature of this invention. In this example, the exemplary depicted destination parties are USER_1 through to USER_4. A particular destination party's record within the database 124 maintains a relationship between a network identifier of the particular destination party's communication device (such as communication device 106B) and an identifier of the particular destination party's television receiver (such as the set-top box 108B). The database 124 may comprise further records denoting various aspects of the destination party's business relationship with the service provider such as services subscribed to, channel packages subscribed to and the like.

In some embodiments of the present invention, there may be more that one telephony link associated with the destination party premises 104B and there may be more than one communication device 106B, each communication device 106B associated with each separate telephony link. For instance, plural members of the destination party premises 104B may have their own separate communication device 106B with associated network identifiers (i.e. separate telephone number). In these embodiments, a particular destination party record in the database 124 may further maintain an association between plural communication device 106B identifiers and corresponding names of the members of the destination party premises 104B.

In some embodiments of the present invention, the database 124 can further comprise records associated with potential originating parties, such as the originating party 102A. These records can be provisioned and/or modified by the destination party 102B during the subscription process for the CLID information announcement feature of this invention or at a later time. As such, the records associated with potential originating parties can be associated with each particular destination party 102B. In some embodiments of the present invention, the destination party 102B can group the potential originating parties according to various categories, such as family, co-workers and the like. The destination party 102B can further assign specific still or animated images to the groups and/or to a specific potential destination party that can be displayed along with or instead of the CLID information announcement as will be described in greater detail herein below.

Specifically, in one scenario for a hypothetical destination party 102B denoted as USER_1 in the record 504, the network identifier of the communication device 106B can be a telephone number (in this scenario, the communication device 106B can be a POTS phone, a VoIP phone, a VoIP soft client and the like). The network identifier of the set-top box 108B can be a MAC address. In this exemplary scenario, the identifier of the communication device 106B can be "111-111-2222" and the identifier of the set-top box 108B can be "13567891011". The record 504 can comprise further information about USER_1 generally depicted at 504E.

In another scenario for a hypothetical destination party 102B denoted as USER_2 in the record 506, the network identifier of the communication device 106B can be a telephone number (in this scenario, the communication device 106B can be a POTS phone, a VoIP phone, a VoIP soft client and the like) and the network identifier of the set-top box 108B can be an IP address. In this exemplary scenario, the identifier of the communication device 106B can be "555-333-4444" and the identifier of the set-top box 108B can be "7.2.5.65". It should be noted that the IP address can be either static or dynamic and in case of a dynamic IP address, the database 124 is operable to dynamically update the records (such as record 506) in a manner known to those of skill in the art. The record 506 can comprise further information about USER_2 generally depicted at 506E.

In a further scenario for a hypothetical destination party 102B denoted as USER_3 in the record 508, the network identifier of the communication device 106B can be an IP address (in this scenario, the communication device 106B can be a VoIP phone, a VoIP soft client and the like). The network identifier of the set-top box 108B can be a pre-defined alpha-numerical or numerical address. In this exemplary scenario, the identifier of the communication device 106B can be "8.5.6.75" and the identifier of the set-top box 108B can be "3456_X". The record 508 can comprise further information about USER_3 generally depicted at 508E. In this particular example, the record 508 can comprise a name associated with the particular member of the destination party premises 104B, such as "Andrea" or "mom".

In a further scenario for a hypothetical destination party 102B denoted as USER_4 in the record 510, the USER_4 may have multiple communication devices 106B and, as such, may have multiple network identifiers (telephone numbers, IP addresses, etc.) associated with respective multiple communication devices 106B. For instance, the destination party 102B may have more than one telephone line, may have a VoIP phone and a PSTN phone, a combination of multiple POTS and VoIP phones, as well as a combination of wireline and wireless phones. In this scenario several network identifiers (such as telephone numbers, IP addresses, etc.) can be associated with a single identifier of the set-top box 108B. For example, "111-222-3333" may be a telephone number associated with a first communication device 106B associated with USER_4 (for example, a PSTN or VoIP wireline phone). "111-333-5555" may be a telephone number associated with a second communication device 106B associated with USER_4 (for example, another PSTN or VoIP wireline phone or a wireless communication device), and "8.5.6.85" may be an IP Address associated with a third communication device 106B associated with USER_4 (for example, a VoIP wireline phone). The network identifier of the set-top box 108B can be a pre-defined alpha-numerical or numerical address. In this exemplary scenario, the identifier of the set-top box 108B can be "3456_Y". The record 510 can comprise further information about USER_4 generally depicted at 510E. In this particular example, the record 510 can comprise a name associated with each of the telephone numbers associated with the USER_4. For instance, the number "111-222-3333" can be associated with John Doe, the number "111-333-5555" can be associated with Jane Doe and the IP address "8.5.6.85" can be associated with Bob Doe.

The database 124 can comprise a number of further user records associated with destination parties 102B other than USER_1, USER_2, USER_3 or USER_4 generally depicted as 512. It should be appreciated that any other suitable identifiers for communication devices and set-top boxes can be used. Naturally, other combinations of network identifiers for communication devices 106B or set-top boxes 108B can be used. For example, plural network identifiers associated with plural set-top boxes 108B can be associated with a single identifier of a communication device 106B.

Returning to FIG. 1, the processing entity 120 further comprises the aforementioned video control portion 126. The video control portion 126 may be managed and/or controlled by the same entity as the call control portion 122. Alternatively, the video control portion 126 may be under management and/or control of a third party. The video control portion 126 can be located in the same physical location as the call control portion 122 or, alternatively, the video control portion 126 can be located in a different physical location from the call control portion 122 (such as another building, another city or another country for that matter).

The video control portion 126 is connected to a television receiver (such as the set-top box 108B) via a video distribution network 142. The nature of the video distribution network 142 is not particularly limiting and, as such, the video distribution network 142 can include a portion of the direct-to-home satellite broadcasting network, a cable distribution network, an xDSL-based distribution network, a data network adapted for video-over-IP distribution or a combination thereof. It should be appreciated that the video control portion 126 can be further coupled to a number of other customers' set-top boxes, this being omitted from the FIG. 1 for the sake of simplicity.

In one specific non-limiting example, the video control portion 126 comprises an HP Proliant BL20p G3 Blade Server manufactured by Hewlett-Packard Company of 3000 Hanover Street, Palo Alto, Calif., USA. As will be discussed in greater detail herein below, the video control portion 126 is operable to receive messages from the call control portion 122, to process the so-received messages and to send messages to one or more set-top boxes (such as the set-top box 108B) via the video distribution network 142. It should be appreciated that the video control portion 126 may be operable to perform a number of other functions, such as compiling a variety of content from various content sources, multiplexing various content streams, encoding the multiplexed content streams for distribution, transmitting the encoded content streams to a number of set-top boxes, billing, maintaining customer profiles and channel line-ups.

Figure 2:
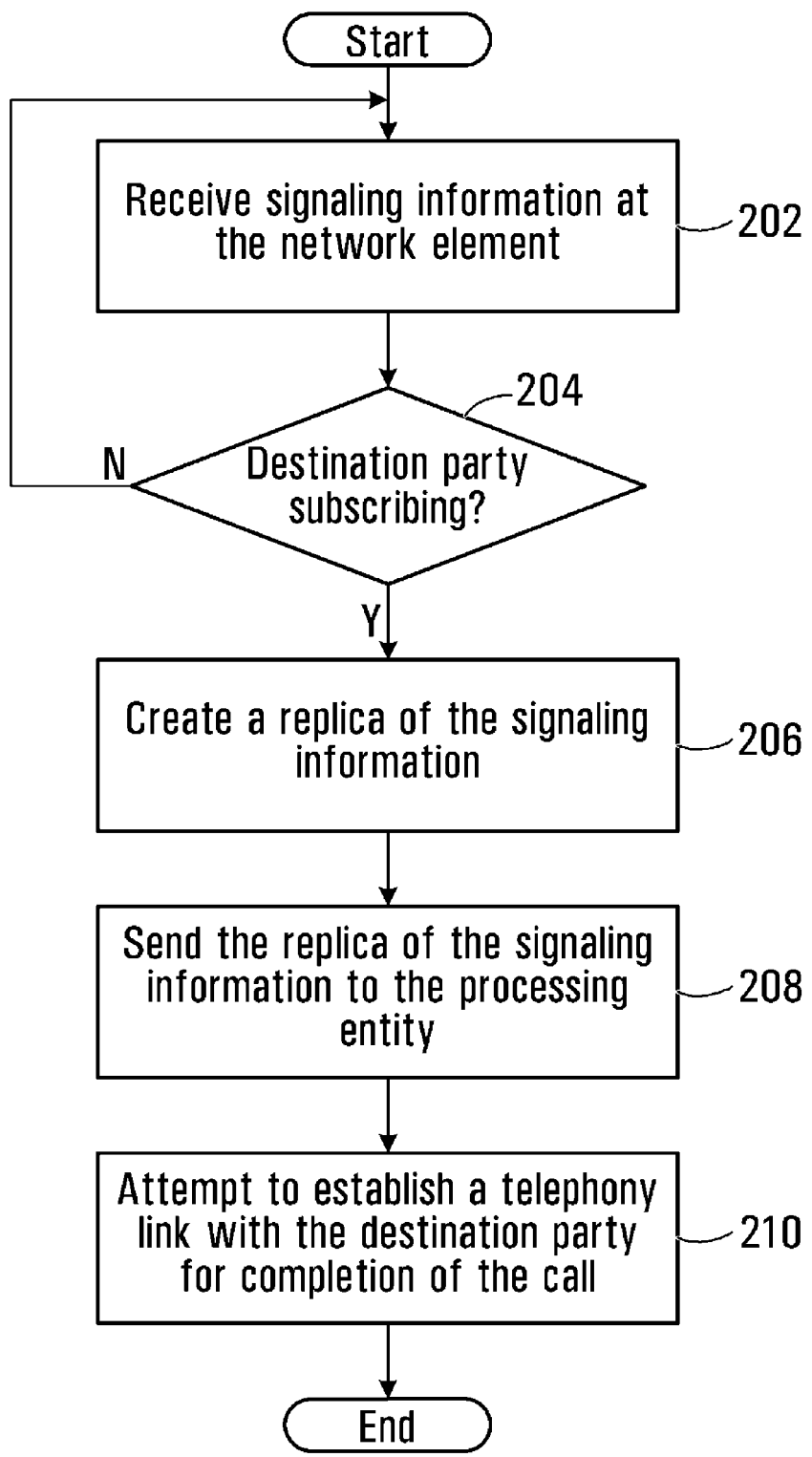
FIG. 2 depicts a flow chart of a method for extracting information indicative of an originator of an incoming call for announcement to the user on a television screen executable at a terminating network element depicted in FIG. 1.

With reference to FIG. 2 and to FIGS. 4A and 4B, operation of the network element 114B in the context of extracting information associated with the incoming call arriving via the network 112 for the destination party 102B will now be described. FIG. 2 depicts a method for creating a replica of signalling information. FIGS. 4A and 4B depict a flow of signals, which are exchanged while performing the method of FIG. 2 in two embodiments of the present invention.

In the first scenario, described with reference to FIG. 2 and FIG. 4A, it is assumed that the communication device 106B is PSTN-based (such as a POTS phone, etc.). It will be appreciated that in this scenario, the communication network 112 can comprise at least a portion of the PSTN and the network elements 114A and 114B can comprise switches (such as DMS-100).

At step 202, the network element 114B receives signalling information associated with the incoming call destined for the destination party 102B. Specifically, as part of the signal flow S1 between the network element 114A and the network element 114B exchanged during the establishment of the incoming call, signalling information is exchanged. A portion of the signal flow S1 comprises a CLID element 402 (i.e. information associated with the originator of the incoming call, such as the telephone number of the communication device 106A associated with the originating party 102A, a name associated with the originating party 102A or a combination thereof) and a DN element 404 (i.e. information associated with the destination of the call, such as the telephone number of the communication device 106B associated with the destination party 102B).

In this scenario, the signalling information can be embodied in an SS7 initial address message (IAM) message (i.e. a call set-up message known to those skilled in the art) comprising a telephone number associated with originating party 102A or a combination of a telephone number and a name associated with the originating party 102A. Various fields of the IAM message can be used for storing such information, such as a Personal Information Parameter (PIP) field or the Generic Name field. It should be appreciated that the signalling information or a portion thereof can be embodied in SS7 messages exchanged subsequent to the IAM message, such as but not limited to a call progress message, etc.

In alternative scenarios, the signalling information may only contain a telephone number associated with the originating party 102A, but not the name associated with the originating party 102A. In these scenarios, the network element 114B can determine the name of the originating party 102A can be determined by accessing a name database (such as a Line Information Data Bases (LIDB) database) to perform a look-up based on a network identifier (ex. a telephone number, an IP address or the like) associated with the originating party 102A. The accessing of the database can be performed by issuing a Transaction Capabilities Application Part (TCAP) query using the telephone number extracted from the signalling information.

At step 204, the network element 114B can determine whether the destination party 102B is a party that subscribes to the CLID information announcement feature of this invention. Firstly, an identity of the destination party 102B is determined from the signalling information associated with the incoming call (ex. the telephone number associated with the destination party 102B contained in the SS7 IAM message or any other suitable SS7 message). Specifically, the information contained in the DN element 404 can be used to determine identity of the destination party 102B. The network element 114B consults the processing database 115 and determines whether the extracted destination information has been provisioned with the CLID information announcement feature of this invention. In alternative embodiments of the present invention, the determination of whether the destination party 102B subscribes to the CLID information announcement feature of this invention can be performed by retrieving a specific CLID announcement flag, such as but not limited to a Termination Attempt Trigger, a simultaneous call trigger or the like.

If it is determined that the destination information has not been provisioned with the CLID information announcement feature of this invention (i.e. the "NO" branch of step 204), then the network element 114B returns to step 202 where it continues to monitor whether signalling information associated with another incoming call has been received.

For the purposes of the present example, it is assumed that the destination party 102B does indeed subscribe to the CLID information announcement feature (i.e. the "YES" branch of step 204) and, as such, the telephone number associated with the destination party 102B has been provisioned as such in the processing database 115 of the network element 114B. It should be noted that step 204 is optional and may be omitted in some embodiments of the present invention.

Having determined that the destination party 102B subscribes to the CLID information announcement feature of this invention, the network element 114B proceeds to step 206. Specifically, the network element 114B creates a replica of the signalling information associated with the incoming call. It should be further understood that the signalling information may comprise plural quanta of information and the so-created replica may contain a portion or the entirety of the plural quanta of information.

For the benefit of the reader it should be explained what information may be contained in the CLID element 402. The CLID element 402 can contain a network identifier associated with the origin of the incoming call (i.e. the telephone number associated with the communication device 106A). The CLID element 402 can further contain a registered name associated with the originating party 102A. As such the CLID element 402 may contain the following information: "613-111-6471; John Doe" denoting that the telephone number associated with the communication device 106A associated with the originating party 102A is "613-111-6471" and the registered name associated with the originating party 102A is "John Doe". It should be appreciated that the CLID element 402 may comprise additional or alternative information, as will be apparent to those of skill in the art. In the particular example whereby the CLID element 402 contains only the telephone number associated with the communication device 106A, the name can be determined by performing a database look-up (such as by issuing a TCAP query to an LIDB database). The process for generating the telephone number information and the registered name is usually performed during the provisioning of a telephony link to the originating party premises 104A. The network element 114B is operable to create a replica of at least the CLID element 402 and DN element 404 contained in the signal flow S1.

At step 208 the network element 114B sends the replica of the signalling information to the call control portion 122 of the processing entity 120. Specifically, the network element 114B can attempt to establish a telephony link to the call control portion 122 to convey the replica of the signalling information to the call control portion 122. In one specific non-limiting example, the network element 114B uses a simultaneous ringing (sometimes referred to as a SIMRing) function of the DMS-100 switch that creates a call to more than one terminating number. In another specific non-limiting example, the network element 114B can send a TCAP query to the call control portion 122. No matter how the telephony link with the call control portion 122 is established, the telephony link can be established via the network element 140 associated with the processing entity 220.

Specifically, the network element 114B creates a signal flow S2 destined for the network element 140. To create the signal flow S2, the network element 114B extracts the DN element 404 and augments the DN element 404 with a special routing code (depicted as SC element 406). In one specific non-limiting example, the SC element 406 comprises three (3) digits that signify to various network elements in the communications network 112 to route the replica of the signalling information to the network element 140 associated with the call control portion 122 of the processing entity 120. It should be understood that in other embodiments of the present invention, any other format of the SC element 406 could be utilized which can be but is not limited to numerical codes, alpha-numerical codes or the like. The SC element 406 indicates to the various elements of the communication network 112 (such as the network element 140 and the like) that the telephony link being established with the call control portion 122 should actually terminate at the call control portion 122. As such, the signal flow S2 comprises at least the CLID element 402 (denoting the information associated with the originator of the incoming call, such as the originating party 102A), and the augmented DN element comprising the DN element 404 (denoting the information associated with the destination party, such as the destination party 102B) and the SC element 406. The signal flow S2 is transmitted to the network element 140.

The network element 140 receives the replica of the signalling information embedded in the signal flow S2 and extracts various components embedded therein, such as information associated with the origin of the incoming call (i.e. CLID element 402) and the augmented destination information (i.e. the DN element 404 and the SC element 406). Responsive to receipt of the replica of signalling information embedded in signal flow S2, the network element 140 extracts the augmented destination information (i.e. the DN element 404 and the SC element 406) and deletes the special routing code (i.e. SC element 406).

The network element 140 then creates a signal flow S3 destined for the call control portion 122, effectively sending the destination information (i.e. DN element 404) and the information associated with the origin of the incoming call (i.e. CLID element 402) to the call control portion 122. It will be recalled that in some embodiments of the present invention, the network element 140 is connected to the call control portion 122 via an ISDN PRI (MegaLink). In these embodiments, the CLID element 402 and the DN element 404 are transmitted to the call control portion 122 as part of a Q.931 Setup Message.

It should now be clear that by virtue of step 208 and the signal flows S2 and S3, the call control portion 122 becomes aware of the information representing the origin of an incoming call, as well as information associated with the destination party 102B. Put another way, the network element 114B is operable to extract signalling information associated with the incoming call and to transmit the extracted signalling information to the processing entity 120 via the network element 140. The steps performed by the call control portion 122 will be described in detail herein below with reference to FIG. 3.

At step 210, the network element 114B attempts to establish a telephony link with the communication device 106B. Specifically, the network element 114B creates a signal flow S4 to the communication device 106B using the DN element 404 (i.e. destination information associated with the communication device 106B). The signal flow S4 can comprise the CLID element 402. In the above-discussed scenario of the communication network 112 being the PSTN, the signal flow S4 can comprise an SS7 call set-up message known to those skilled in the art. It should be noted that step 210 can be performed at the same time as the steps 206/208, before the steps 206/208 are performed or after the steps 206/208 have been performed.

With continued reference to FIG. 2 and with reference to FIG. 4B, in another scenario, it is assumed that the destination party 102B uses a VoIP-based communication device 106B (such as a Voice-over-IP (VoIP) phone or a Voice-over-IP (VoIP) soft client). It will be appreciated that in this scenario, the communication network 112 comprises at least a portion of a data network adapted for handling Voice-over-IP (VoIP) calls, such as the Internet, and the network elements 114A and 114B are soft switches. It should be understood, that the network elements 114A and 114B can be embodied in a single soft switch. In this scenario, the signalling information comprises a Session Initiation Protocol (SIP) message (i.e. a Session Initiation Protocol (SIP) invite message known to those skilled in the art).

At step 202, the network element 114B receives signalling information associated with the incoming call destined for the destination party 102B, depicted as signal flow F1. The signalling information may be received from the communication device 106A as depicted in FIG. 4B, from another originating communication device or from the network element 114A. In this scenario, the signalling information depicted as the signal flow F1 comprises a Session Initiation Protocol (SIP) invite message. Among other information, the signal flow F1 comprises information associated with the communication device 106A, including the network address and/or the registered name of the originating party 102A (i.e. CLID element 402) and the network identifier of the communication device 106B (i.e. DN element 404).

At step 204, the network element 114B determines whether the destination party 102B is a party that subscribes to the CLID information announcement feature of this invention. Specifically, the identity of the destination party 102B can be determined from the signalling information associated with the incoming call (ex. the CLID element 402 that contains the telephone number or another information associated with the destination party 102B, such as the IP address). The network element 114B consults the processing database 115 and determines whether the extracted destination information has been provisioned with the CLID information announcement feature of this invention. If it is determined that the destination information has not been provisioned with the CLID information announcement feature of this invention (i.e. the "NO" branch of step 204), then the network element 114B returns to step 202 where it continues to monitor whether signalling information associated with another incoming call has been received.

For the purposes of the present example, it is assumed that the destination party 102B does indeed subscribe to the CLID information announcement feature (i.e. the "YES" branch of step 204) and, as such, the telephone number or another identifier (such as an IP address or the like) associated with the destination party 102B has been provisioned as such in the processing database 115 of the network element 114B. Having determined that the destination party 102B subscribes to the CLID information announcement feature of this invention, the network element 114B proceeds to step 206 where it creates a replica of the signalling information.

An alternative implementation of step 204 will now be discussed. In some embodiments of the present invention, if a particular destination party 102B subscribes to the CLID information announcement feature of this invention, the appropriate flag in the processing database 115 is inserted to designate the call control portion 122 as a "registered agent" for the destination party 102B. In other words, the entry is provisioned to trigger a simultaneous connection to the network address associated with the call control portion 122 and the network address associated with the destination party 102B. In one-specific non-limiting example, consider the following scenario. The communication device 106B has an IP address 108.55.22.101 and the call control portion 122 has an IP address 108.66.33.202. In this scenario the communication network 112 is adapted to handle Voice-over-IP (VoIP) calls. The destination party 102B associated with the communication device 106B subscribes to the CLID information announcement feature of this invention and as such an entry associated with the destination party 102B can be made in the processing database 115 to denote that when a call destined for the destination party 102B arrives, an attempt should be made to establish a telephony link to two destination numbers, i.e. the IP address associated with the destination party 102B (ex. 108.55.22.101) and the IP address associated with the call control portion 122 (ex. 108.66.33.202). In other words, the call control portion 122 can be provisioned as a "registered agent" associated with the destination party 102B alongside with the communication device 106B and any other registered agents that the destination party 102B may have. It should be understood that in this scenario, it is inherent that the destination party 102B subscribes to the CLID information announcement feature of this invention and the network element 114B proceeds to step 206.

At step 206, the network element 114B creates a replica of signalling information. In one specific non-limiting example, the network element 114B can create a copy of the Session Initiation Protocol (SIP) invite message by establishing a telephony link with the call control portion 122. In some embodiments of the present invention, the network element 114B can create the telephony link with the call control portion 122 (i.e. effectively create a copy of the Session Initiation Protocol (SIP) invite message) using a "proxy" function known to those of skill in the art (also sometimes referred to as "proxying" or "proxying simultaneous ringing"). It should be appreciated that any other suitable method for creating a replica of the signalling information can be used. It should be further understood that signalling information may comprise a plural quanta of information and the so-created replica may contain a portion or the entirety of this plural quanta of information.

At step 208 the network element 114B sends the replica of the signalling information to the call control portion 122 of the processing entity 120, which in this case may comprise a Ubiquity Application Server as previously described. The network element 114B is operable to transmit an IP packet (ex. a UDP or a TCP packet containing a replica of the Session Initiation Protocol (SIP) invite message) containing the replica of signalling information to the call control portion 122 over the communication network 112 and via the network element 140, which in this case may be a switch or the like. Specifically, the network element 114B creates a signal flow F2 containing the CLID element 402 (representing the network address and/or the registered name of the originating party 102A) and the DN element 404 (representing the network identifier of the communication device 106B). The signal flow information announcement service F2 is then transmitted to the call control portion 122. To summarize, the network element 114B is operable to extract signalling information associated with the incoming call and to transmit the extracted signalling information to the call control portion 122 of the processing entity 120.

At step 210, the network element 114B attempts to establish a telephony link with the communication device 106B. In the above-discussed scenario where the communication network 112 is a data network adapted for handling Voice-over-IP (VoIP) calls, this attempt comprises forwarding the IP packet comprising Session Initiation Protocol (SIP) invite message to the communication device 106B using the network address contained in the Session Initiation Protocol (SIP) invite message. Specifically, the network element 114B creates a signal flow F3 destined for the communication device 106B containing the CLID element 402 (representing the network address and/or the registered name of the originating party 102A) and the DN element 404 (representing the network identifier of the communication device 106B).

Figure 3:
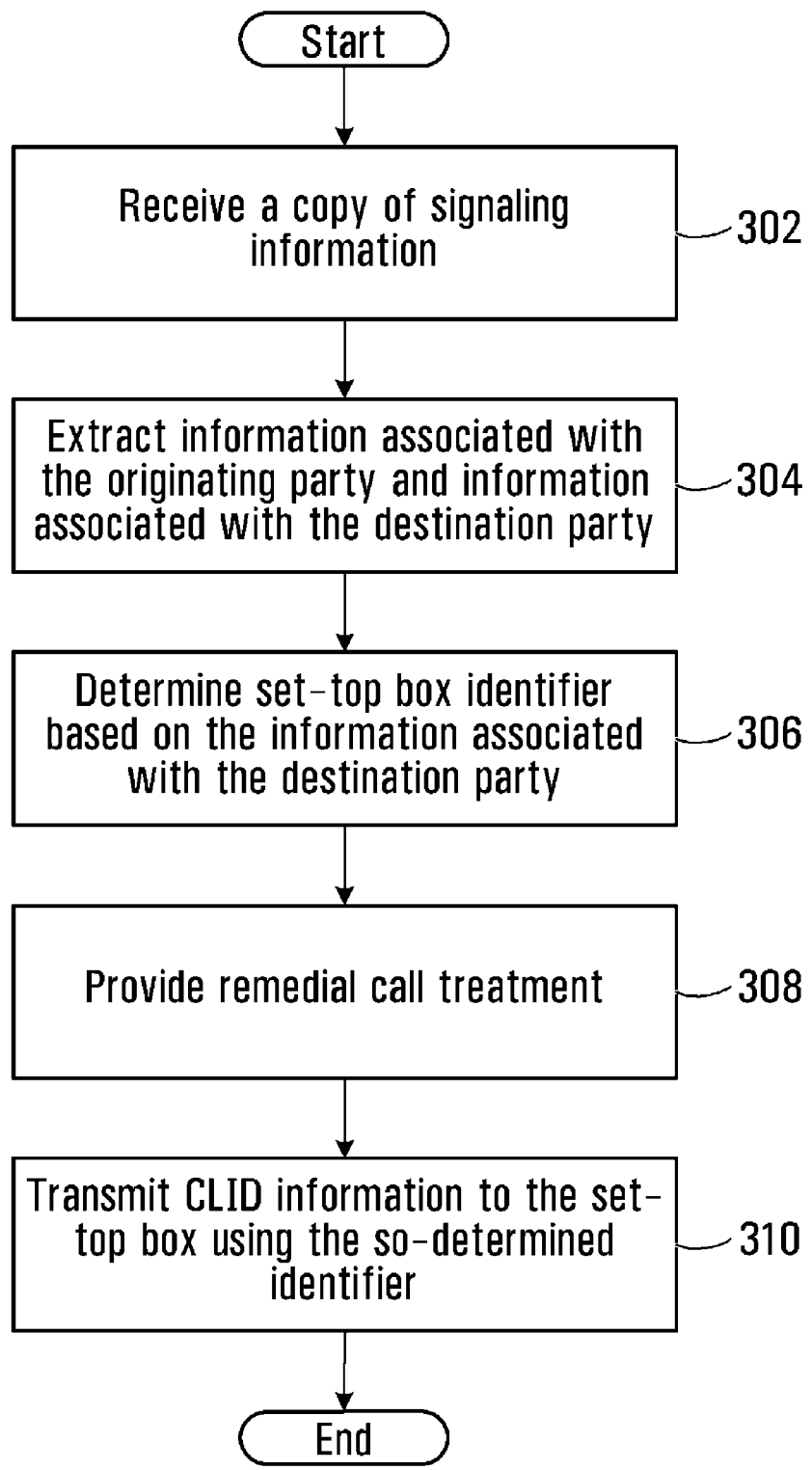
FIG. 3 depicts a flow chart of a method for forwarding information indicative of an originator of an incoming call to the user, the method executable at a processing entity of FIG. 1.

Operation of the processing entity 120 in the context of extracting information associated with the incoming call arriving via the network 112 for the destination party 102B will now be described. For illustration purposes only, the operation of the processing entity 120 will be described with reference to the PSTN-based scenario described with reference to FIG. 2 and FIG. 4A. It should be understood that the following discussion of the operation of the processing entity 120 can be adapted to the aforementioned VoIP-based scenario. With reference to FIG. 3, a method for extracting information associated with the incoming call will be described. For illustration purposes, reference will also be made to FIG. 4C, which depicts a flow of signals, exchanged while performing the method of FIG. 3. The method of FIG. 3 can be conveniently implemented at the call control portion 122. It should be noted the method of FIG. 3 can be performed simultaneously with, before or after certain steps of the method of FIG. 2. In one specific non-limiting example, the method for extracting information associated with the incoming call can be performed simultaneously with, before or after the aforementioned step 210 of the method of FIG. 2 (i.e. attempting to establish a telephony link with the destination party 102B for completion of the call).

At step 302, the call control portion 122 receives the replica of the signalling information from the network element 114B. In some embodiments of the present invention, the call control portion 122 receives the replica of the signalling information from the network element associated with the processing entity 120, such as the network element 140 (depicted as signal flow S3).

At step 304, the call control portion 122 extracts the CLID element 402 and the DN element 404 from the signal flow S1 of FIG. 4A. Specifically, the call control portion 122 can retrieve the CLID element 402 and DN element 404 from the Q.931 Setup Message received from the network element 140. For the benefit of the reader it should be recalled what information may be contained in CLID element 402. The CLID element 402 contains a network identifier associated with the origin of the incoming call (i.e. the telephone number, IP address, etc. associated with the communication device 106A) and, in some circumstances, a name associated with the originating party 102A. In these circumstances, the call control portion 122 will extract the network identifier associated with the originator of the incoming call and will transmit the extracted network identifier to the set-top box 108B, as will be described in greater detail herein below.

However, it will be appreciated that service providers allow their customers options to suppress the transmission of their number, by a feature generally known as "Presentation Restricted". If the "Presentation Restricted" feature has been invoked for a particular originating party 102A, the CLID element will comprise a suitable trigger. If the call control portion 122 retrieves such "Presentation Restricted" trigger from the CLID element 402, it is operable to generate a "Private Caller" message that will be used in lieu of the information associated with the originating party 102A. It should be noted that any other suitable message can be used, such as "Caller Number not Available" or the like.

In some circumstances, the CLID information may contain numbers that are not recognized by the call control portion 122. With particular reference to the North American telephone numbering scheme (which assigns telephone numbers having 7 or 10 digits), if the number contained in the CLID information is neither 7 nor 10 digits long, the call control portion 122 is operable to generate "Private Caller" message that will be used in lieu of the information associated with the originating party 102A. It should be noted that any other suitable message can be used, such as "Caller Number not Available" or the like.

In some embodiments of the present invention, the call control portion 122 can determine additional information associated with the originating party 102A. Specific reference is made to an embodiment whereby as the CLID element 402 contains only a telephone number associated with the communication device 106A. In these embodiments, the call control portion 122 can determine a name associated with the originating party 102A based on the telephone number contained in the CLID element 402. Specifically, the call control portion 122 may access a name database (not depicted), which can comprise a LIDB database, to retrieve the name associated with the specific telephone number associated with the communication device 106A. The accessing of the name database can be performed by issuing a TCAP query. It should be understood that any other suitable method for determining the name associated with the originating party 102A can be used. In further embodiments, the retrieved name may be used instead of the network identifier associated with the communication device 106A.

At step 306, the call control portion 122 determines a network identifier associated with the set-top box 108B (an ID element 408) that in turn is associated with the destination party 102B. It will be recalled that the database 124 maintains a number of records containing user profiles. For the purposes of this example, it will be assumed that record 504 denoting USER_1 is associated with the destination party 102B. The call control portion 122 accesses the database 124 and performs a query based on the received DN element 404 (which in this case is assumed to be "111-111-2222") to determine whether there exists a network identifier for a set-top box corresponding to the particular DN element 404. Based on the query to record 504, it is determined that the identifier of the set-top box 108B is "7.2.5.65".

In the above-mentioned PSTN-based scenario discussed with reference to FIG. 2 and FIG. 4A, at step 308 appropriate remedial call treatment is provided. It will be recalled that the replica of the signalling information can be created and transmitted by the network element 114B using a SIMRing feature. It will be appreciated by those of skill in the art that the SIMRing function effectively establishes a call to the processing entity 120. The call control portion 122 is operable to instruct the network element 140 to return a busy signal so as to indicate to the network element 114B (which originated the SIMRing function) that the call to the call control portion 122 can not be answered. Alternatively, the remedial call treatment provided in step 308 may comprise the call control portion 122 not answering the call and the network element 140 returning a no answer (i.e. constant ringing signal) to the network element 114B. Effectively, step 308 ensures that the call control portion 122 receives the replica of signalling information without actually answering the call from the network element 114B. It should be noted that any other remedial call treatment that would prevent the incoming call from being connected to any party other than the destination party 102B can be used.

It should be understood, that in alternative embodiments (for instance in the above-mentioned VoIP-based scenario described with reference to FIG. 2 and FIG. 4B), step 308 can be omitted. In one specific non-limiting example, if the communication network 112 comprises the data network adapted for handling Voice-over-IP (VoIP) calls and in the case that the replica of signalling information received at step 302 comprises a replica of Session Initiation Protocol (SIP) invite message, step 308 need not be performed.

At step 310, the call control portion 122 transmits the CLID element 402 and the ID element 408 to the set-top box 108B. This step is logically depicted as signal flow S5 on FIG. 4C. It will be recalled that the set-top box identifier (i.e. the ID element 408) was determined in step 306. In some embodiments of the present invention, the CLID element 402 and the ID element 408 can be transmitted to the set-top box 108B via the video control portion 126.

In a specific non-limiting example, the call control portion 122 generates a Simple Object Access Protocol (SOAP) message containing the CLID element 402 and the ID element 408 (i.e. the identifier of the set-top box 108B determined in step 306) and transmits the SOAP message to the video control portion 126. It should be noted that any other suitable format for transmitting the CLID element 102 and the ID element 408 can be used, such as an HTML message, an XML message or the like.

The video control portion 126 is operable to receive the SOAP message from the call control portion 122 from which it retrieves the CLID element 402 and the ID element 408. Responsive to retrieval of the CLID element 402 and the identifier of the set-top box 108B (i.e. the ID element 408), the video control portion 126 generates a CLID announcement trigger (such as an XML trigger, a proprietary protocol trigger, an API based trigger or any other suitable trigger) and transmits the CLID announcement trigger to the appropriate set-top box 108B. It will be recalled that the identifier of the set-top box (i.e. ID element 408) was determined in step determined in step 306. Therefore, the video control portion 126 can address the CLID announcement trigger using the ID element 408 for distribution via the video distribution network 142.

The transmission of the CLID announcement trigger to the appropriate set-top box 108B can be implemented in any suitable manner, which depends on the type of the video distribution network 142 used. In one specific non-limiting example of the video distribution network 142 comprising a direct-to-home satellite distribution network, the CLID announcement trigger can be encapsulated into a token and the token can be broadcast to all the available set-top boxes (such as set-top box 108B). The token can further comprise an identifier of the set-top box 108B to which the CLID announcement trigger pertains (i.e. the ID element determined in step 306). The set-top box 108B that has the same identifier as the one encapsulated into the broadcast token is operable to recognize its identifier and to retrieve the CLID announcement trigger encapsulated into the distributed token. In another specific non-limiting example where the video distribution network 142 comprises an IPTV based television system, the CLID announcement trigger can be encapsulated into an IP packet having an address that contains the ID element determined in step 306. The IP packet can be transmitted to the set-top box 108B via the video distribution network 142. Specifically, the CLID announcement trigger can be packetized into a TCP or UDP packet and transmitted to the set-top box 108B using the network identifier of the set-top box 108B (such as an IP address). Yet in another specific non-limiting example of the distribution network 142 comprising a cable network, the video control portion 126 can transmit the CLID announcement trigger to all the available set-top boxes and to authorize the set-top box 106B to retrieve the CLID announcement trigger.

Irrespective of how the CLID announcement trigger is transmitted to the set-top box 108B, upon receipt of the CLID announcement trigger, the set-top box 108B is operable to convey a CLID announcement using the display 110B. It should be noted that it is contemplated that the CLID announcement may comprise several components, which depends on the content of the CLID element 402. In some embodiments of the present invention, the CLID announcement can comprise a telephone number associated with the origin of the incoming call. In other embodiments of the present invention, the CLID announcement may comprise a telephone number and the associated registered name of the originating party 102A. In these embodiments, the display 110B can present an image representing either the telephone number of the communication device 106A, the name of the originating party 102A or combination thereof on the display 110B using a picture-in-picture mode or image overlay mode.

In further embodiments, it is contemplated that a category associated with the type of the originating party may be further displayed (such as family, friends, business and the like). Yet in further embodiments, it is contemplated that an image associated with the originating party 102A (such as a still or animated image or the like) can be displayed. The category information and/or the image associated with the originating party 102A can be maintained in an additional information file that can be stored either in the database 124 or in the set-top box 108B. This additional information file can be pre-provisioned by the destination party 102B for each potential originating party 102A. The additional information file can be retrieved from the database 124 or the set-top box 108B based on the CLID information associated with the originating party 102A.

It is further contemplated that the CLID announcement trigger generated at step 310 may comprise information associated with identity of the destination party 102B (for instance, a telephone number associated with the communication device 106B or the name/alias associated with a particular member of the destination party premises 104B), which can be included in the CLID information announcement presented to the destination party 102B. This is particularly useful, when the destination party 102B has more than one telephony link terminating at the destination party premises 104B and, as such, may have access to more than one communication device 106B. To that extent, the CLID information announcement presented to the destination party 102B can comprise a telephone number associated with a particular communication device 106B for which the incoming call is destined.

Alternatively, the CLID information announcement presented to the destination party 102B may comprise a visual indicator that is associated with a particular member of the destination party premises 104B. It should be recalled that the database 124 may comprise an indication of the identity of a particular member of the destination party premises 104B (such as the name or alias associated with the particular member of the destination party premises 104B) with whom a particular telephony link is associated. As such, the call control portion 122 can augment the CLID announcement trigger with such an indication. In an alternative embodiment, the indication of the identity of a particular member of the destination party premises 104B can be stored at the set-top box 108B and the set-top box 108B can retrieve such an indication based on the network identifier associated with the communication device 106B. When the set-top box 108B retrieves such an indication from the CLID announcement trigger or retrieves such an indication pursuant to a local look-up, it is operable to present the indication to the destination party 102B with the CLID information announcement. In one specific non limiting example, the set-top box 108B can cause displaying of the name or alias associated with the destination party 102B (for instance, "Andrea" or "mom"). In another specific non-limiting example, another visual indicator can be provided (such as a color-coded indicator or the like). These additional features allow the destination party 102B to more effectively identify the communication device 106B to which the incoming call is placed and/or the specific member of the destination party premises 104B for whom the incoming call is destined.

In addition, it should be appreciated that certain steps of the method of FIG. 3 are performed independently and irrespective of outcome of certain steps of the method of FIG. 2. To illustrate, consider the following example. The destination party 102B may be enjoying a particular program using the display 110B. At the same time someone at the destination party premises 104B is using the communication device 106B. At the same time, the originating party 102A attempts to make an incoming call destined for the destination party 102B. According to various steps of the method of FIG. 2, the network element 114B creates a replica of the signalling information and forwards same to the call control portion 122. The network element 114B further attempts to complete the call to the communication device 106B. The attempt is likely to result in a failure (such as a busy signal or voice mail), and consequently the originating party 102A will not be able to reach the destination party 102B. However, the call control portion 122 performs steps 302, 304, 306, 308 and 310 of the method of FIG. 3 and transmits the CLID announcement trigger to the set-top box 180B via the video distribution network 142. Pursuant to receipt of such a CLID announcement trigger, the set-top box 108B will provide a CLID information announcement to the destination party 102B using the display 110B. As such, the destination party 102B becomes aware of the information associated with the origin of the incoming call even if the telephony link (i.e. link via the communication network 112) is busy or unavailable for another reason.

Those skilled in the art will appreciate that in some embodiments, certain functionality of the processing entity 120 and/or the set-top box 108B and/or the network element 114B may be implemented as pre-programmed hardware or firmware elements (e.g., application specific integrated circuits (ASICs), electrically erasable programmable read-only memories (EEPROMs), etc.), or other related components. In other embodiments, the call control portion 122 and/or the set-top box 108B and/or the network element 114B may comprise an arithmetic and logic unit (ALU) having access to a code memory (not shown) which stores program instructions for the operation of the ALU in order to execute the various processes described above. The program instructions could be stored on a medium which is fixed, tangible and readable directly by the processing entity 120 and/or the set-top box 108B and/or the network element 114B (e.g., removable diskette, CD-ROM, ROM, or fixed disk), or the program instructions could be stored remotely but transmittable to the processing entity 120 and/or the set-top box 108B and/or the network element 114B via a modem or other interface device (e.g., a communications adapter) connected to a network over a transmission medium. The transmission medium may be either a tangible medium (e.g., optical or analog communications lines) or a medium implemented using wireless techniques (e.g., microwave, infrared or other transmission schemes).

Persons skilled in the art will appreciate that there are yet further alternative implementations and modifications possible for implementing the present invention, and that the above implementations and examples are only illustrations of one or more embodiments of the present invention. The scope of the invention, therefore, is only to be limited by the claims appended hereto.

The invention claimed is:

1. A method, comprising:
    receiving signalling information associated with an incoming call destined for a destination party, the signalling information comprising a portion conveying information regarding an origin of the incoming call and information regarding an identity of the destination party;
    attempting to establish a first telephony link with a device associated with the destination party over a communication network, in response to said receiving;
    identifying a registered agent for the destination party;
    attempting to establish a second telephony link with the registered agent for the destination party to release said portion of the signalling information to the registered agent for the destination party, wherein receipt of said portion of the signalling information by the registered agent for the destination party causes delivery of an indication of the origin of the incoming call over a television link associated with the destination party, said indication based on said information regarding the origin of the incoming call.

2. The method of claim 1, wherein said receiving signalling information comprises receiving an SS7 initial address message (IAM) message.

3. The method of claim 1, wherein said attempting to establish the second telephony link comprises augmenting said portion of the signalling information with a routing code, the routing code for indicating to the communication network that said portion of the signalling information is to be routed to the registered agent.

4. The method of claim 1, wherein said attempting to establish the second telephony link comprises invoking a simultaneous ringing function.

5. The method of claim 4, further comprising detecting remedial call treatment provided by the registered agent via said second telephony link in response to the registered agent receiving said portion of the signalling information.

6. The method of claim 5, wherein said remedial call treatment comprises one of a busy signal and a no answer signal.

7. The method of claim 1, wherein said receiving signalling information comprises receiving a Session Initiation Protocol (SIP) invite message.

8. The method of claim 7, wherein said attempting to establish the second telephony link comprises forwarding a replica of the Session Initiation Protocol (SIP) invite message to the registered agent.

9. The method of claim 7, further comprising provisioning a network address associated with the processing entity as the registered agent for the destination party.

10. The method of claim 1, wherein said attempting to establish the second telephony link comprises invoking a proxy function.

11. The method of claim 1, wherein said information regarding the origin of the incoming call comprises one of a telephone number and an IP address; and
    wherein said information regarding an identity of the destination party comprises one of a telephone number and an IP address.

12. The method of claim 11, wherein said information regarding the origin of the incoming call further comprises a name associated with the originating party.

13. The method of claim 1, further comprising triggering the processing entity registered agent to determine a name associated with the origin of the incoming call.

14. The method of claim 13, wherein said triggering the processing entity registered agent comprises triggering the registered agent to access a database comprising a plurality of names, each name associated with potential information regarding an origin of an incoming call.

15. The method of claim 1, wherein said information regarding the origin of the incoming call comprises at least one of a telephone number, an IP address and a name associated with the origin of the incoming call; and wherein said identity of the destination party comprises one of a telephone number and an IP address.

16. The method of claim 1, wherein said indication of the origin of the incoming call comprises said information regarding the origin of the incoming call.

17. The method of claim 1, further comprising accessing a database to determine said indication of the origin of the incoming call based on said information regarding the origin of the incoming call.

18. The method of claim 17, wherein said information regarding the origin of the incoming call comprises a network identifier associated with the origin of the incoming call; and wherein said indication of the origin of the incoming call comprises at least a name associated with the origin of the incoming call.

19. The method of claim 1, wherein said attempting to establish a receipt of said portion of the signalling information over the second telephony link with a processing entity causes the processing entity registered agent to forward an announcement trigger to a set-top box associated with the destination party via the television link, the announcement trigger comprising at least said indication of the origin of the incoming call for conveyance over a display connected to the set-top box.

20. The method of claim 19, wherein the announcement trigger is instrumental in causing the conveyance of said indication of the origin of the incoming call over the display.

21. The method of claim 1, wherein said attempting to establish the first telephony link with a device associated with the destination party and said attempting to establish the second telephony link processing are performed simultaneously.

22. The method of claim 1, wherein said attempting to establish the first telephony link is performed before said attempting to establish the second telephony link.

23. The method of claim 1, wherein said attempting to establish the first telephony link is performed after said attempting to establish the second telephony link.

24. The method of claim 1, further comprising determining whether said destination party subscribes to an announcement service for enabling the information regarding the origin of the incoming call to be announced to the destination party over a television link associated with the destination party.

25. The method of claim 24, wherein said attempting to establish the second telephony link with a processing entity is performed only if said determining step is positive.

26. A network element adapted to perform the method of claim 1.

27. A method, comprising:
receiving signalling information from a network element in the course of an attempt by the network element to establish a second telephony link, the signalling information comprising a portion conveying information regarding an origin of an incoming call and information regarding an identity of a destination party; wherein the network element is responsible for attempting to establish a first telephony link with a device associated with the destination party over a network in response to receipt of the signalling information associated with the incoming call;
causing distribution of an announcement trigger over a plurality of television links in response to said receiving, the plurality of television links including a particular television link associated with the destination party, the announcement trigger for causing a set-top box associated with the particular television link to announce to the destination party an indication of the origin of the incoming call, said indication being based on said information regarding the origin of the incoming call; and
providing remedial call treatment to said network element to indicate that the attempt to establish the second telephony link was unsuccessful.

28. The method of claim 27, wherein said signalling information comprises an SS7 initial address message (IAM) message.

29. The method of claim 27, wherein said information regarding the origin of the incoming call comprises at least one of a telephone number, an IP address and a name associated with the origin of the incoming call; and wherein said information regarding an identity of the destination party comprises one of a telephone number and an IP address.

30. The method of claim 27, further comprising determining a network identifier of a set-top box associated with the destination party.

31. The method of claim 30, wherein said determining is performed based on said information regarding an identity of the destination party.

32. The method of claim 30, the destination party being a particular destination party, the method further comprising:
accessing a database, said database comprising at least one record, each of the at least one record maintaining a relationship between information regarding an identity of a respective destination party and a corresponding network identifier of a set-top box associated with the respective destination party;
retrieving from the database the network identifier of the set-top box associated with the particular destination party based on the information regarding an identity of the particular destination party.

33. The method of claim 32, wherein said respective information regarding an identity of the particular destination party comprises one of a telephone number and an Internet Protocol (IP) address.

34. The method of claim 27, wherein said causing distribution of an announcement trigger comprises forwarding the announcement trigger via the television link.

35. The method of claim 27, wherein causing distribution of the announcement trigger comprises forwarding the announcement trigger to a video control portion, the video control portion having control over the particular television link.

36. The method of claim 35, wherein said forwarding the announcement trigger comprises creating one of a SOAP message, an HTML message and an XML message.

37. The method of claim 27, further comprising
exclusively authorizing the set-top box associated with the particular television link to be responsive to the announcement trigger.

38. The method of claim 37, further comprising determining a network identifier associated with the set-top box associated with the particular television link.

39. The method of claim 38, wherein said distributing the announcement trigger comprises distributing said network identifier associated with the set-top box, wherein said exclusively authorizing is triggered by said network identifier associated with the set-top box.

40. The method of claim 27, wherein said causing distribution comprises addressing said announcement trigger to the set-top box associated with the particular television link.

41. The method of claim 27, wherein said causing distribution of an announcement trigger comprises forwarding additional information associated with the origin of the incoming call.

42. The method of claim 41, wherein said additional information comprises at least one of an image associated with a potential origin of the incoming call, an indication of a group to which a potential origin of the incoming call belongs and a photo associated with a potential origin of the incoming call.

43. The method of claim 41, wherein said forwarding additional information associated with the origin of the incoming call comprises accessing a database to retrieve said additional information associated with the origin of the incoming call based on said information regarding the origin of the incoming call.

44. The method of claim 27, wherein said indication of the origin of the incoming call includes at least said information regarding the origin of the incoming call.

45. The method of claim 27, further comprising determining a name associated with the origin of the incoming call.

46. The method of claim 45, wherein said determining a name associated with the origin of the incoming call comprises:
accessing a database; said database maintaining a relationship between each of a plurality of information regarding an origin of the incoming call and a corresponding name;
retrieving a name associated with the origin of the incoming call based on said information regarding the origin of the incoming call.

47. The method of claim 27, wherein said causing distribution of an announcement trigger comprises causing determination of an indication of the identity of the destination party; said indication of the destination party being based on the information regarding the identity of the destination party.

48. The method of claim 47, wherein said indication of the identity of the destination party comprises at least one of a telephone number associated with the destination party, an Internet Protocol (IP) address associated with the destination party, a name associated with the destination party, an alias associated with the destination party, an image associated with the destination party and a color-coded indication associated with the destination party.

49. The method of claim 47, wherein said causing determination of an indication of the identity of the destination party comprises accessing a database to retrieve said indication of the identity of the destination party based on the information regarding an identity of the destination party.

50. The method of claim 49, wherein said causing determination of an indication of the identity of the destination party comprises triggering the set-top box associated with the destination party to access a database to retrieve said indication of the identity of the destination party based on the information regarding an identity of the destination party.

51. The method of claim 27, wherein said providing a remedial call treatment comprises generating one of a busy signal and a no answer signal over said second telephony link.

52. The method of claim 27, wherein said information regarding the origin of the incoming call comprises a telephone number associated with the origin of the incoming call.

53. The method of claim 52, further comprising determining a name associated with the origin of the incoming call based on said information regarding the origin of the incoming call.

54. The method of claim 53, wherein said determining a name associated with the origin of the incoming call comprises accessing a database; said database maintaining a relationship between each of a plurality of information regarding an origin of the incoming call and a corresponding name.

55. A system, comprising:
at least one network element associated with a communication network; and
a processing entity;
wherein the at least one network element is operable to receive signalling information associated with an incoming call destined for a destination party, the signalling information comprising a portion conveying information regarding an origin of the incoming call and information regarding an identity of the destination party;
wherein the at least one network element is operable to respond to receipt of the signalling information to attempt establishing a first telephony link with a device associated with the destination party over a portion of the communication network;
wherein the at least one network element is operable to identify the processing entity as a registered agent for the destination party;
wherein the at least one network is operable to attempt establishing a second telephony link with the processing entity to release said portion of the signalling information to the processing entity;
wherein the processing entity is operable to receive said portion of the signalling information to cause delivery of an indication of the origin of the incoming call over a television link associated with the destination party, said indication based on said information regarding the origin of the incoming call.

56. The system of claim 55, wherein said communication network comprises a Public Switched Telephone Network (PSTN); and wherein said signalling information comprises an SS7 initial address message (IAM) message.

57. The system of claim 53, wherein to release said portion of the signalling information, the at least one network element is further operable to augment said portion of the signalling information with a routing code, the routing code being operable to indicate to said communication network that said portion of the signalling information is to be routed to the processing entity.

58. The system of claim 55, wherein to attempt establishing the second telephony link, the at least one network element is operable to invoke a simultaneous ringing function.

59. The system of claim 58, wherein said processing entity is operable to provide remedial call treatment to said at least one network element via said second telephony link in response to receipt of said portion of the signalling information.

60. The system of claim 59, wherein said remedial call treatment comprises one of a busy signal and a no answer signal.

61. The system of claim 55, wherein said communication network comprises a data network adapted for handling Voice-over-IP (VoIP) calls; and wherein said signalling information traverses the data network and comprises a Session Initiation Protocol (SIP) invite message.

62. The system of claim 61, wherein to attempt establishing the second telephony link, the at least one network element is operable to invoke a proxy function.

63. The system of claim 61, wherein to release said portion of the signalling information, the at least one network element is operable to create a replica of the Session Initiation Protocol (SIP) invite message and to forward the created replica of said Session Initiation Protocol (SIP) invite message to the processing entity over the data network.

64. The system of claim 61, wherein a network address associated with the processing entity is provisioned as the registered agent for the destination party.

65. The system of claim 55, wherein the processing entity comprises a video control portion, the video control portion having control over the television link associated with the destination party; and wherein the processing entity is further operable to transmit the announcement trigger to the video control portion for distribution over the television link associated with the destination party.

66. The system of claim 55, the destination party being a particular destination party, wherein the system further comprises, said database operable to maintain at least one record, each of the at least one record maintaining a relationship between information regarding an identity of a respective destination party and a corresponding network identifier of a set-top box associated with the respective destination party.

67. The system of claim 66, wherein said information regarding the origin of the incoming call is one of a telephone number and an Internet Protocol (IP) address.

68. The system of claim 66, wherein said database is further operable to maintain additional information provisioned by the destination party.

69. The system of claim 68, wherein said additional information comprises at least one of an image associated with a potential origin of the incoming call, an indication of a group to which a potential origin of the incoming call belongs and a photo associated with a potential origin of the incoming call.

70. The system of claim 69, wherein said additional information can be used to generate an additional indication of the identity of the origin of the incoming call based on the information regarding the origin of the incoming call.

71. The system of claim 55, further comprising a distribution network, wherein said television link traverses said distribution network.

72. The system of claim 71, wherein said distribution network comprises one of a direct-to home broadcasting network, a cable distribution network and a video-over-IP distribution network.

73. The system of claim 55, further comprising a set-top box associated with the destination party, wherein to cause delivery of an indication of the origin of the incoming call, the processing entity is operable to transmit an announcement trigger to the set-top box, the announcement trigger comprising at least said indication of the origin of the incoming call.

74. The system of claim 73, wherein pursuant to receipt of the announcement trigger, said set-top box is operable to extract said indication of the origin of the incoming call.

75. The system of claim 74, wherein said set-top box is further operable to cause displaying of said indication of the origin of the incoming call to the destination party.

76. A network element, comprising:
means for receiving signalling information associated with an incoming call destined for a destination party, the signalling information comprising a portion conveying information regarding an origin of the incoming call and information regarding an identity of the destination party;
means for attempting to establish a first telephony link with a device associated with the destination party over a communication network in response to said receiving;
means for identifying a registered agent for the destination party;
means for attempting to establish a second telephony link with the registered agent for the destination party to release said portion of the signalling information to the registered agent for the destination party, wherein receipt of said portion of the signalling information by the registered agent for the destination party causes delivery of an indication of the origin of the incoming call over a television link associated with the destination party, said indication based on said information regarding the origin of the incoming call.

77. A processing entity, comprising:
means for receiving signalling information from a network element in the course of an attempt by the network element to establish a second telephony link, the signalling information comprising a portion conveying information regarding an origin of an incoming call and information regarding an identity of a destination party; wherein the network element is responsible for attempting to establish a first telephony link with a device associated with the destination party over a network in response to receipt of the signalling information associated with the incoming call;
means for causing distribution of an announcement trigger over a plurality of television links in response to said receiving, the plurality of television links including a particular television link associated with the destination party, the announcement trigger for causing a set-top box associated with the particular television link to announce to the destination party an indication of the origin of the incoming call, said indication being based on said information regarding the origin of the incoming call; and
means for providing remedial call treatment to said network element to indicate that the attempt to establish the second telephony link was unsuccessful.

* * * * *